(12) United States Patent
Zhang et al.

(10) Patent No.: US 12,197,083 B2
(45) Date of Patent: Jan. 14, 2025

(54) DISPLAY PANEL AND DISPLAY DEVICE

(71) Applicant: Wuhan China Star Optoelectronics Technology Co., Ltd., Wuhan (CN)

(72) Inventors: Guoyu Zhang, Wuhan (CN); Teng Wu, Wuhan (CN); Yufeng Xia, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/619,551

(22) PCT Filed: Nov. 29, 2021

(86) PCT No.: PCT/CN2021/134122
§ 371 (c)(1),
(2) Date: May 19, 2023

(87) PCT Pub. No.: WO2023/082364
PCT Pub. Date: May 19, 2023

(65) Prior Publication Data
US 2024/0045271 A1   Feb. 8, 2024

(30) Foreign Application Priority Data

Nov. 15, 2021   (CN) .......................... 202111348662.4

(51) Int. Cl.
G02F 1/1337   (2006.01)
G02F 1/1333   (2006.01)
(Continued)

(52) U.S. Cl.
CPC ...... *G02F 1/1337* (2013.01); *G02F 1/133357* (2021.01); *G02B 5/208* (2013.01); *G02F 1/133512* (2013.01); *G02F 1/133514* (2013.01)

(58) Field of Classification Search
None
See application file for complete search history.

(56) References Cited

U.S. PATENT DOCUMENTS

2006/0103782 A1   5/2006   Adachi et al.
2016/0011633 A1   1/2016   Watanabe et al.
(Continued)

FOREIGN PATENT DOCUMENTS

CN   107946341 A   4/2018
CN   109164648 A   1/2019
(Continued)

OTHER PUBLICATIONS

Japanese Office Action issued in corresponding Japanese Patent Application No. 特願 2021-573227 dated Jan. 29, 2024, pp. 1-5.
(Continued)

*Primary Examiner* — Dung T Nguyen
(74) *Attorney, Agent, or Firm* — PV IP PC; Wei Te Chung

(57) ABSTRACT

A display panel and a display device are disclosed. The display panel comprises a display area and a light-transmitting area, and at least one alignment layer is provided with a hole in the light-transmitting area. In the present application, a hole is provided in at least one alignment layer of the display panel. Therefore, when external light enters the optical element through the display panel, the filtering effect of the alignment layer on the light is greatly reduced, and light loss is reduced, to improve the light transmittance of the area of the display panel corresponding to the optical element to effectively increase the amount of light collected by the optical element.

17 Claims, 6 Drawing Sheets

(51) Int. Cl.
　　　*G02B 5/20*　　　(2006.01)
　　　*G02F 1/1335*　　(2006.01)

(56) References Cited

U.S. PATENT DOCUMENTS

2019/0310524 A1* 10/2019 Nagata .............. G02F 1/133528
2020/0117034 A1*  4/2020 Yin ................... G02F 1/133528

FOREIGN PATENT DOCUMENTS

| | | |
|---|---|---|
| CN | 109283722 A | 1/2019 |
| CN | 110941112 A | 3/2020 |
| CN | 111142281 A | 5/2020 |
| CN | 211180468 U | 8/2020 |
| CN | 111965872 A | 11/2020 |
| CN | 111983838 A | 11/2020 |
| CN | 112180633 A | 1/2021 |
| CN | 112509468 A | 3/2021 |
| EP | 0772071 A1 | 5/1997 |
| JP | 2019184827 A | 10/2019 |
| JP | 2020518010 A | 6/2020 |
| KR | 20200002968 A | 1/2020 |

OTHER PUBLICATIONS

Korean Office Action issued in corresponding Korean Patent Application No. 10-2022-7013205 dated Aug. 13, 2024, pp. 1-8.

* cited by examiner

DISPLAY PANEL AND DISPLAY DEVICE

CROSS-REFERENCE TO RELATED APPLICATION

This application is a national phase application under 35 U.S.C. § 371 of PCT Application No. PCT/CN2021/134122 filed Nov. 29, 2021, which claims priority to Chinese Application No. 202111348662.4 filed Nov. 15, 2021, the contents of which are incorporated herein by reference in their entirety.

The present application relates to a display field, and more particularly to a display panel and a display device.

BACKGROUND OF THE INVENTION

The Liquid Crystal Display (LCD) possesses advantages of high image quality, power saving, thin body and wide application range, stable performance and safety, etc. Thus, it has been widely applied in various consumer electrical products, such as vehicles, mobile phone, television, personal digital assistant, digital camera, notebook, laptop, and becomes the major display device.

In the automotive display, the Driver Monitor System (DMS) can monitor the driver's fatigue and improve driving safety. At the same time, with the gradual maturity of autonomous driving, Internet of Vehicles and related technologies, DMS has gradually evolved and iterated more functions, and has gradually been accepted by users. In order to meet the monitoring requirements of DMS, it is necessary to install an optical element on the liquid crystal display. The optical element is a camera for an illustration. For avoiding misunderstandings caused by directly exposing the camera to the user's field of view, the existing LCDs equipped with DMS function mostly adopt the solution of hiding the camera on the back of the LCD panel. However, this solution does not only solve the problem of camera exposure but also enables the camera to perform daylighting function, the external ambient light needs to pass through the LCD panel at least before it can enter the camera smoothly. This greatly increases the difficulty for the camera to collect external ambient light, which directly leads to the problem of insufficient lighting by the camera and poor DMS imaging result, which needs to be solved urgently.

SUMMARY OF THE INVENTION

The present application provides a display panel and a display device thereof, which can increase the light transmittance of the display panel, and reduce the difficulty for optical elements to collect external ambient light, and increase the amount of light collected by the optical element.

First, the embodiment of the present application provides a display panel, wherein the display panel comprises: a first substrate and a second substrate, which are oppositely arranged, and a liquid crystal layer arranged between the first substrate and second substrate, and the first substrate and the second substrate are both provided with an alignment layer on a side close to the liquid crystal layer, wherein the display panel comprises a display area and a light-transmitting area, and at least one of the alignment layers is provided with a hole in the light-transmitting area.

Optionally, any one of the alignment layers is provided with a hole in the light-transmitting area.

Optionally, the hole is filled with an optical film material, and an infrared light transmittance of the optical film material is greater than an infrared light transmittance of the alignment layer.

Optionally, a visible light reflectivity of the optical film material is less than a visible light reflectivity of the alignment layer.

Optionally, the alignment layers comprise a first alignment layer provided on the first substrate and a second alignment layer provided on the second substrate, and the first alignment layer is provided with a first hole in the light-transmitting area and the second alignment layer is provided with a second hole in the light-transmitting area, and an area of the first hole and an area of the second hole are the same or different.

Optionally, the display area and the light-transmitting area are spaced apart, and the display panel further comprises a transition area, and the transition area is located in a gap area between the display area and the light-transmitting area, and a display panel film structure of the transition area is different from a display panel film structure of the display area and a display panel film structure of the light-transmitting area.

Optionally, the first substrate comprises: a first base substrate and a black matrix layer provided on the first base substrate, and the black matrix layer is located in the display area, and the black matrix layer comprises a black matrix ring located at a boundary of the display area and the transition area.

Optionally, the first substrate further comprises a color filter layer and a first planarization layer sequentially stacked on the black matrix layer, and the color filter layer is located in the display area, the transition area and the light transmission area, and the first planarization layer is located in the display area, the transition area and the light transmission area, and a thickness of the first planarization layer in the light-transmitting area is greater than a thickness of the first planarization layer in the display area.

Optionally, the first substrate further comprises the first alignment layer disposed on the first planarization layer, and the first alignment layer is located in the display area and the transition area, and the first alignment layer is provided with the first hole in the light-transmitting area, and an edge of the first hole is located at the boundary of the light-transmitting area and the transition area.

Optionally, the first substrate further comprises a first optical film material filled in the first hole, and an infrared light transmittance of the first optical film material is greater than an infrared light transmittance of the alignment layer.

Optionally, the first substrate further comprises a support column layer disposed between the first alignment layer and the first planarization layer, and the support column layer comprises a plurality of support columns arranged at intervals, and the plurality of support columns are located in the display area.

Optionally, the second substrate comprises: a second base substrate and a thin film transistor layer disposed on the second base substrate, and the thin film transistor layer comprises a thin film transistor and a metal trace, and the thin film transistor is located in the display area and the transition area; the metal trace is located in the display area and the transition area; wherein the metal trace located in the transition area is a ring trace.

Optionally, the thin film transistor layer further comprises an interlayer dielectric layer disposed on the second base substrate, and the interlayer dielectric layer is located in the display area and the transition area.

Optionally, the second substrate further comprises a second planarization layer disposed on the interlayer dielectric layer, and the second planarization layer is located in the display area, the transition area and the light-transmitting area, and a thickness of the second planarization layer in the light-transmitting area is greater than a thickness of the second planarization layer in the display area.

Optionally, the second substrate further comprises a composite film layer disposed on the second planarization layer, and the composite film layer comprises a first transparent conductive layer, a passivation layer and a second transparent conductive layer sequentially stacked on the second planarization layer, and the composite film layer is located in the display area.

Optionally, the second substrate further comprises a third planarization layer disposed on the composite film layer, and the third planarization layer is located in the display area, the transition area and the light-transmitting area, and a thickness of the third planarization layer in the light-transmitting area is greater than a thickness of the third planarization layer in the display area.

Optionally, the second substrate further comprises the second alignment layer disposed on the third planarization layer, and the second alignment layer is located in the display area, the transition area, and the light-transmitting area, and the second alignment layer is provided with the second hole in the light-transmitting area, and an edge of the second hole is located in the light-transmitting area.

Optionally, the second substrate further comprises a second optical film material filled in the second hole, and an infrared light transmittance of the second optical film material is greater than an infrared light transmittance of the alignment layer.

Second, the embodiment of the present application further provides a display device, wherein the display device comprises: an optical element, a backlight module and the display panel of any one of the above, and the backlight module is arranged on a side of the display panel, and the backlight module is provided with a light-transmitting hole at a position corresponding to the light-transmitting area; the optical element is arranged on a side of the backlight module away from the display panel, and the optical element is arranged corresponding to the light-transmitting hole.

Optionally, the optical element is an infrared camera.

Compared with the prior art, the display panel and the display device provided by the present application provide a hole in at least one alignment layer of the display panel. Therefore, when external light enters the optical element through the display panel, the filtering effect of the alignment layer on the light is greatly reduced, and light loss is reduced, to improve the light transmittance of the area of the display panel corresponding to the optical element. It is to reduce the difficulty for optical elements to collect external ambient light, and increase the amount of light collected by the optical element for improving the imaging result of the optical element.

BRIEF DESCRIPTION OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

DETAILED DESCRIPTION OF PREFERRED EMBODIMENTS

Figure 1:
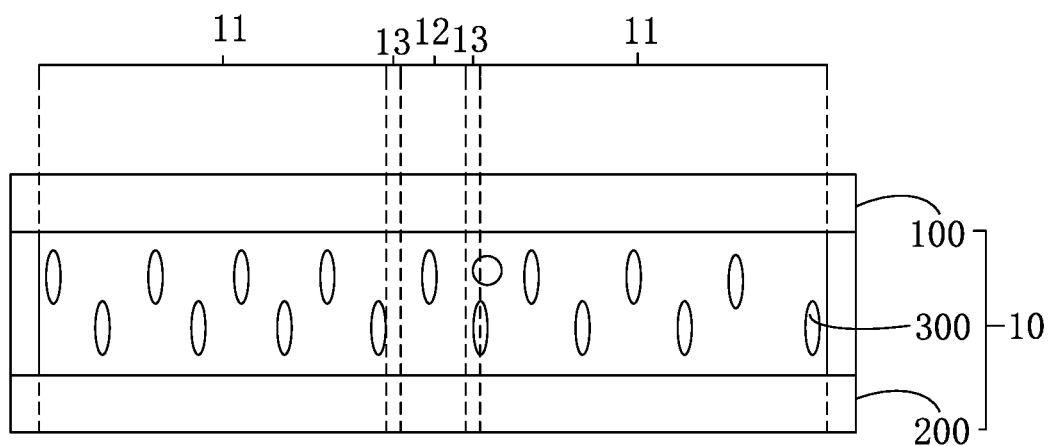
FIG. 1 shows a structural diagram of a display panel provided by an embodiment of the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of skilled in the premise of no creative efforts obtained, should be considered within the scope of protection of the present application. Besides, it should be understood that the specific embodiments described herein are merely for illustrating and explaining the present application and are not intended to limit the present application. In this application, if no explanation is made to the contrary, the orientation words used such as "upper" and "lower" usually refer to the upper and lower of the device in actual use or working state, which specifically are the directions of the drawing in the figures; and "inner" and "outer" refer to the outline of the device.

The following disclosure provides many different embodiments or illustrations for implementing different structures of the present application. In order to simplify the disclosure of the present application, the components and arrangements of the specific illustrations are described below. Certainly, they are merely illustrations and are not intended to limit the present application. In addition, the present application may be repeated with reference to the numerals and/or reference numerals in the various embodiments, which are for the purpose of simplicity and clarity, and do not indicate the relationship between the various embodiments and/or arrangements discussed. Moreover, the present application provides illustrations of various specific processes and materials, but one of ordinary skill in the art will recognize the use of other processes and/or the use of other materials. Detailed descriptions are given below. It should be noted that the order of description in the following embodiments is not meant to limit the preferred order of the embodiments.

FIG. 1 shows a structural diagram of a display panel provided by an embodiment of the present application. As shown in FIG. 1, the embodiment of the present application provides a display panel 10. The display panel 10 comprises: a first substrate 100 and a second substrate 200. The first substrate 100 and the second substrate 200 are oppositely arranged. The display panel 10 further comprises a liquid crystal layer 300 arranged between the first substrate 100 and second substrate 200. Liquid crystal molecules are distributed in the liquid crystal layer 300, and the liquid crystal molecules can be twisted under the action of a driving electric field. The first substrate 100 and the second substrate 200 are both provided with an alignment layer on a side close to the liquid crystal layer 300. The alignment layer can provide uniformly arranged interface conditions for the liquid crystal molecules, so that the liquid crystal molecules are arranged in a predetermined order.

Figure 2:
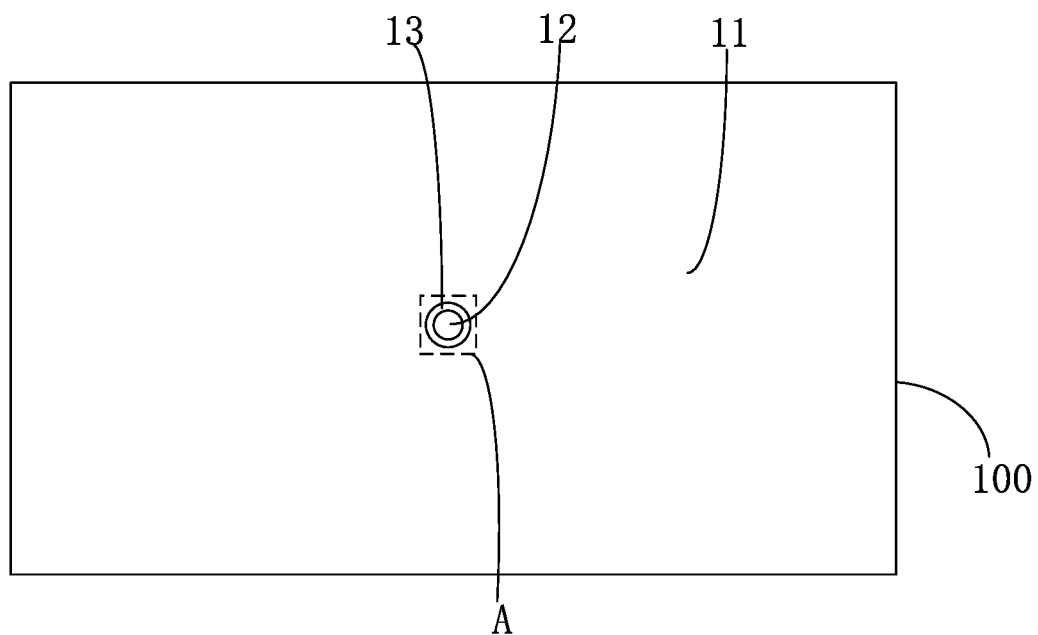
FIG. 2 shows a top-view diagram of a display panel provided by an embodiment of the present application.

FIG. 2 shows a top-view diagram of a display panel provided by an embodiment of the present application. As shown in conjunction with FIGS. 1 and 2, the display panel 10 comprises: a display area 11 and a light-transmitting area 12. The display area 11 of the display panel 10 is provided with pixel units and is employed to perform display functions; the light-transmitting area 12 of the display panel 10 possesses the function of transmitting light, that is, the light transmittance of the light-transmitting area 12 is higher than the light transmittance of the display area 11. Therefore, when an optical element is disposed on a side of the display panel 10 corresponding to a position of the light-transmitting area 12, the light can smoothly pass through the light-transmitting area 12 of the display panel 10 and can be incident on the optical element, so that the optical element normally performs a photosensitive function.

In this embodiment, the alignment layer on the first substrate 100 is a first alignment layer, and the alignment layer on the second substrate 200 is a second alignment layer. The first alignment layer and/or the second alignment layer are provided with holes (not shown in the figure) in the light-transmitting area 12. Since at least one of the alignment layers is provided with a hole in the light-transmitting area 12, the filtering effect of the alignment layer on the light penetrating the light-transmitting area 12 of the display panel 10 can be effectively reduced, and light loss is reduced, to improve the light transmittance of the display panel 10 in the light-transmitting area 12. Preferably, the first alignment layer and the second alignment layer are both provided with holes in the light-transmitting area 12, and the hole in the first alignment layer is corresponding to the hole in the second alignment layer. In this embodiment, by providing holes on both two alignment layers of the display panel 10, the light transmittance of the display panel 10 in the light-transmitting area 12 can be further improved.

In this embodiment, the light is 940 (±10)nm infrared light (Infrared, IR) for instance, and the light transmittance is infrared light transmittance for instance, and the optical element possesses an infrared light sensing function for instance. Since the human body can emit infrared light, when the optical element located on the side of the display panel 10 and corresponding to the light-transmitting area 12 collects the infrared light and forms an image, it can well protect user privacy while accomplishing the monitoring requirements of DMS.

In this embodiment, the hole is filled with an optical film material, and a light transmittance of the optical film material is greater than a light transmittance of the alignment layer. By filling the hole with an optical film material with higher light transmittance, it is possible to increase the light transmittance of the display panel 10 in the light-transmitting area 12 while filling the hole in the alignment layer to achieve planarization.

In this embodiment, a visible light reflectivity of the optical film material is less than a visible light reflectivity of the alignment layer. Since the visible light reflectivity of the optical film material is less than the visible light reflectivity of the alignment layer, the uniform display effect of the display panel 10 can be improved, and the display quality can be improved.

In this embodiment, the optical film material is, for instance, an antireflective film, and the antireflective film is filled in the hole of the alignment layer. The antireflective film can reduce the reflectivity of visible light in the display panel 10 and increase the transmittance of infrared light in the display panel 10.

Continuing to refer to FIG. 2, in this embodiment, the display area 11 and the light-transmitting area 12 are spaced apart, and the display panel 10 further comprises a transition area 13, and the transition area 13 is located in a gap area between the display area 11 and the light-transmitting area 12, and a display panel film structure of the transition area 13 is different from a display panel film structure of the display area 11 and a display panel film structure of the light-transmitting area 12, and the alignment layer is at least disposed in the transition area 13 of the display panel 10. Correspondingly, since the gap area between the display area 11 and the light-transmitting area 12 is also provided with an alignment layer, the liquid crystal molecules located near the boundary area of the display area 11 and the transition area 13 can have the same alignment form as the liquid crystal molecules located in the display area 11 to ensure the display effect of the display area 11.

In this embodiment, the transition area 13 surrounds the light-transmitting area 12, and the display area 11 surrounds the transition area 13.

In this embodiment, the display panel 10 further comprises, for instance, a non-display area, and the non-display area is adjacent to the display area 11, and the non-display area is arranged around the display area 11.

Embodiment One

Figure 3:
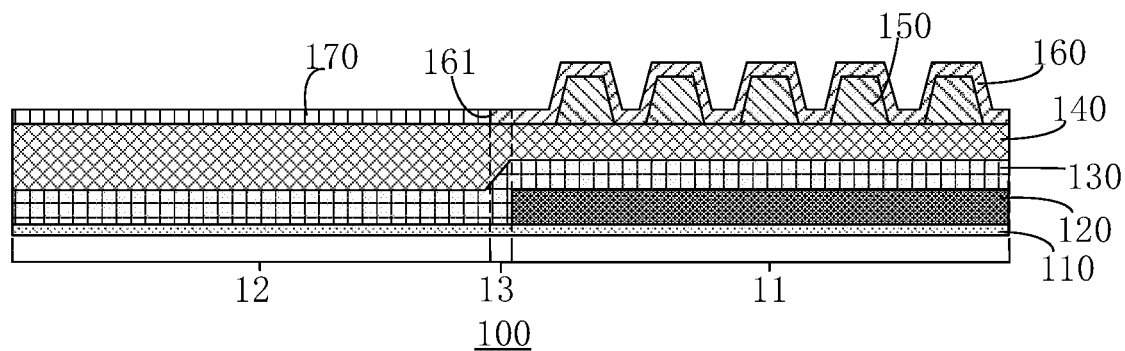
FIG. 3 shows a structural diagram of a first substrate in the display panel provided in the first embodiment of the present application.
Figure 4:
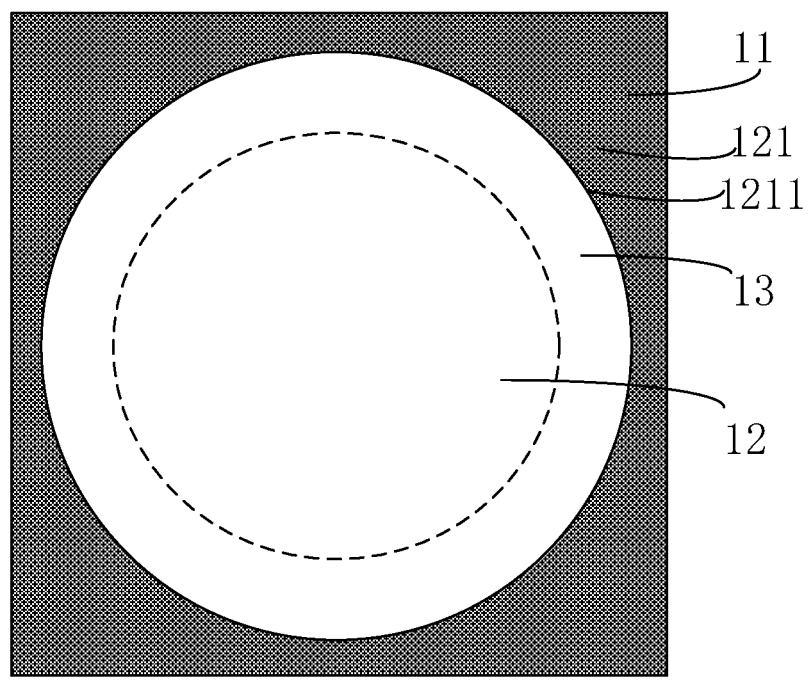
FIG. 4 shows a diagram of a position of a black matrix ring provided in the first embodiment of the present application in the area A in FIG. 2.
Figure 5:
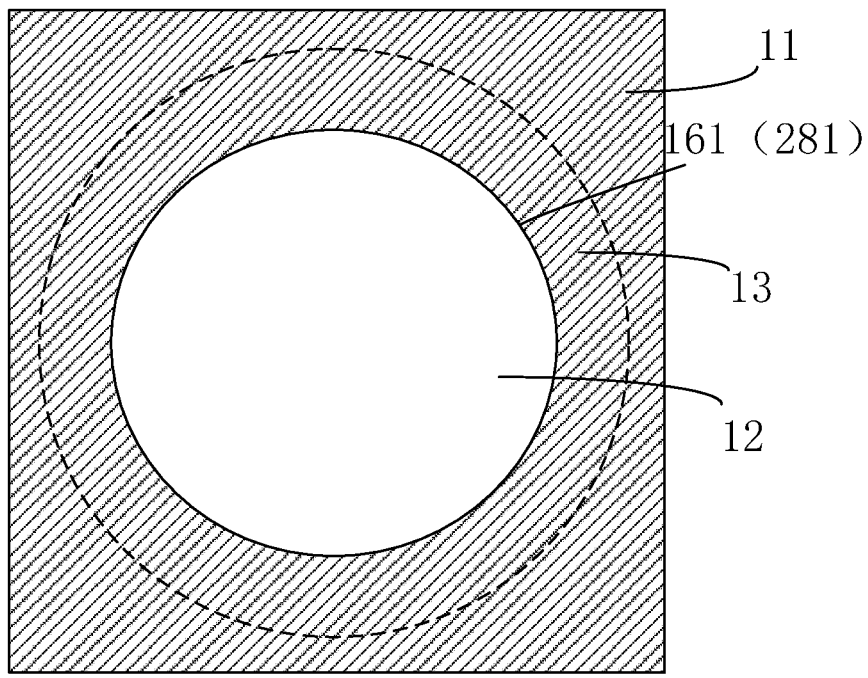
FIG. 5 shows a diagram of a position of a first hole and a second hole provided in the first embodiment of the present application in the area A in FIG. 2.
Figure 6:
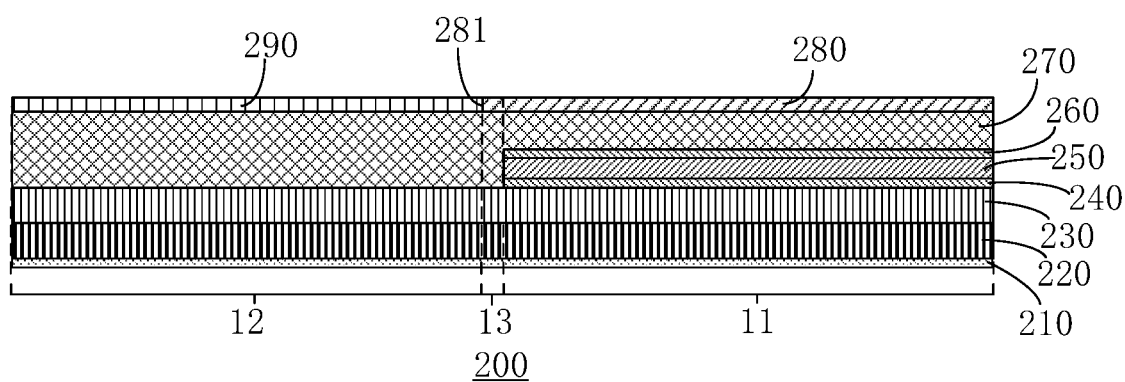
FIG. 6 shows a structural diagram of a second substrate in the display panel provided in the first embodiment of the present application.

FIG. 3 shows a structural diagram of a first substrate in the display panel provided in the first embodiment of the present application; FIG. 4 shows a diagram of a position of a black matrix ring provided in the first embodiment of the present application in the area A in FIG. 2; FIG. 5 shows a diagram of a position of a first hole and a second hole provided in the first embodiment of the present application in the area A in FIG. 2; FIG. 6 shows a structural diagram of a second substrate in the display panel provided in the first embodiment of the present application. The specific film structure of the first substrate 100 and the second substrate 200 in the display panel 10 will be described in detail below with reference to FIGS. 3 to 6.

In this embodiment, the alignment layers comprise a first alignment layer 160 provided on the first substrate 100 and a second alignment layer 280 provided on the second substrate 200, and the first alignment layer 160 is provided with a first hole 161 in the light-transmitting area 12 and the second alignment layer 280 is provided with a second hole 281 in the light-transmitting area 12, and an area of the first hole 161 and an area of the second hole 281 are the same.

In this embodiment, the first substrate 100 comprises: a first base substrate 110. The first base substrate 110 is a carrier of other film structures on the first substrate 100, which can be a rigid substrate or a flexible substrate, and its material can be glass, plastic, or other inorganic or organic materials with excellent light transmittance. Preferably, the first base substrate 110 is a rigid glass substrate.

In this embodiment, the first substrate 100 further comprises a black matrix layer 120 provided on the first base substrate 110, and the black matrix layer 120 is located in the display area 11. That is, the black matrix layer 120 is not provided in the light-transmitting area 12. Since the light-transmitting area 12 omits the black matrix layer 120 with low light transmittance, the light transmittance of the display panel 10 can be further improved. Specifically, the black matrix layer 120 located in the display area 11 is formed with a grid-shaped black matrix structure 121. The infrared light transmittance of the black matrix structure 121 is 0%. Since the first substrate 100 is not provided with the black matrix structure 121 in the light-transmitting area 12, the light transmittance of the infrared light of the light-transmitting area 12 can be greatly improved. Furthermore, the black matrix layer 121 comprises a black matrix ring 1211 located at a boundary of the display area 11 and the transition area 13. That is, the black matrix ring 1211 is the boundary line of the display area 11 and the transition area 13.

In this embodiment, the first substrate 100 further comprises a color filter layer 130 and a first planarization layer 140 sequentially stacked on the black matrix layer 120, and the color filter layer 130 is located in the display area 11, the transition area 13 and the light transmission area 12, and the first planarization layer 140 is located in the display area 11, the transition area 13 and the light transmission area 12, and a thickness of the first planarization layer 140 in the light-transmitting area 12 is greater than a thickness of the first planarization layer 140 in the display area 11. Specifically, the color filter layer 130 located in the display area 11, the transition area 13 and the light-transmitting area 12 is formed by the same process, and the color filter layer 130 of the display area 11 comprises color resist units of multiple colors, and the color resist units are used to realize a color display function; the first planarization layer 140 located in the display area 11, the transition area 13 and the light-transmitting area 12 is formed by the same process, and the surface of the first planarization layer 140 away from the first base substrate 110 is a planar surface for achieving a planarizing function. The infrared light transmittance of the color filter layer 130 is 98%, and the infrared light transmittance of the first planarization layer 140 is 100%. Since the infrared light transmittance of the color filter layer 130 and the first planarization layer 140 are both relatively high, both the color filter layer 130 and the first planarization layer 140 remain in the display area 11 and the light-transmitting area 12.

In this embodiment, the first substrate 100 further comprises a first alignment layer 160 disposed on the first planarization layer 140, and the first alignment layer 160 is located in the display area 11 and the transition area 13, and the first alignment layer 160 is provided with the first hole 161 in the light-transmitting area 12, and an edge of the first hole 161 is located at the boundary of the light-transmitting area 12 and the transition area 13. That is, the edge of the first hole 161 formed in the first alignment layer 160 is the boundary line of the transition area 13 and the light-transmitting area 12. The infrared light transmittance of the first alignment layer 160 is 92%. Since the first alignment layer 160 is omitted in the light-transmitting area 12, the infrared light transmittance of the light-transmitting area 12 can be greatly improved.

In this embodiment, the first substrate 100 further comprises a first optical film material 170 filled in the first hole 161, and an infrared light transmittance of the first optical film material 170 is greater than an infrared light transmittance of the alignment layer 160. Since the first substrate 100 is formed with the first optical film material 170 with higher light transmittance in the area corresponding to the light-transmitting area 12, the infrared light transmittance of the display panel 10 in the light-transmitting area 12 can be effectively improved.

In this embodiment, a visible light reflectivity of the first optical film material 170 is less than a visible light reflectivity of the first alignment layer 160. By reducing the visible light reflectivity of the first optical film material 170, the uniform display effect of the display panel 10 can be improved, and the display quality of the display panel 10 can be improved.

In this embodiment, the first optical film material 170 is, for instance, an antireflective film, and the antireflective film is filled in the first hole 161 of the alignment layer 160. The antireflective film can reduce the reflectivity of visible light in the display panel 10 and increase the transmittance of infrared light in the display panel 10.

In this embodiment, the first substrate 100 further comprises a support column layer 150 disposed between the first alignment layer 160 and the first planarization layer 140, and the support column layer 150 comprises a plurality of support columns arranged at intervals. The support columns can form a stable separation distance between the first substrate 100 and the second substrate 200 to ensure the normal display of the display panel 10. Specifically, the plurality of support columns is located in the display area 11. That is, the support columns are not arranged in the light-transmitting area 12. Since the support column will diffract the infrared light, which will affect the imaging result of the optical element located on the side of the display panel, the support column is not provided in the light-transmitting area 12 in the present application. Therefore, the infrared light transmittance of the display panel 10 in the light-transmitting area 12 can be further improved, while the diffraction phenomenon can be avoided, and the imaging result of the optical element can be improved.

In this embodiment, the second substrate 200 comprises: a second base substrate 210 and a thin film transistor layer disposed on the second base substrate 210, and the thin film transistor layer comprises a thin film transistor and a metal trace, and the thin film transistor is located in the display area 11 and the transition area 13; the metal trace is located in the display area 11 and the transition area 13. That is, the light-transmitting area 12 is not provided with the thin film transistor and the metal trace. The thin film transistor and the metal trace generally comprise opaque metal material. Since the light-transmitting area 12 is not provided with the thin film transistor and the metal trace, the infrared light transmittance of the display panel 10 in the light-transmitting area 12 can be further improved.

In this embodiment, the thin film transistor is, for instance, low temperature polysilicon thin film transistor. The thin film transistor comprises various film layers. The various film layers comprise, for instance, a light-shielding layer, a buffer layer, a first metal layer, a gate insulating layer, an active layer, an interlayer dielectric layer 220 and a second metal layer that are sequentially stacked on the second base substrate 210. The light-shielding layer comprises a light-shielding pattern corresponding to a channel region of the active layer, and the light-shielding layer is located in the display area 11 and the transition area 13; the buffer layer is a laminated structure formed by a silicon nitride film layer and a silicon oxide film layer, and the buffer layer is located in the display area 11, the transition area 13 and the light-transmitting area 12; the first metal layer comprises a gate and metal trace, and the first metal layer is located in the display area 11 and the transition area 13; the gate insulating layer is a silicon oxide film layer, and the gate insulating layer is located in the display area 11, the transition area 13 and the light-transmitting area 12; the active layer comprises a channel region, a heavily doped region and a lightly doped region, and the active layer is located in the display area 11 and the transition area 13; the interlayer dielectric layer 220 is a laminated structure formed by a silicon nitride film layer and a silicon oxide film layer, and the interlayer dielectric layer 220 is located in the display area 11, the transition area 13 and the light-transmitting area 12; the second metal layer comprises a source, a drain and a metal trace, and the second metal layer is located in the display area 11 and the transition area 13. Certainly, the embodiment of the present application does not limit the type of the thin film transistor, and the type of the thin film transistor may also be an amorphous silicon thin film transistor or an oxide thin film transistor.

In this embodiment, the second substrate 200 further comprises a second planarization layer 230 disposed on the interlayer dielectric layer 220, and the second planarization layer 230 is located in the display area 11, the transition area 13 and the light-transmitting area 12. Specifically, the second planarization layer 230 located in the display area 11, the transition area 13 and the light-transmitting area 12 is formed by the same process, and the surface of the second planarization layer 230 away from the second base substrate 210 is a planar surface for achieving a planarizing function.

In this embodiment, the second substrate 200 further comprises a composite film layer disposed on the second planarization layer 230, and the composite film layer comprises a first transparent conductive layer 240, a passivation layer 250 and a second transparent conductive layer 260 sequentially stacked on the second planarization layer 230, and the composite film layer is located in the display area 11. That is, the light-transmitting area 12 is not provided with the composite film layer, so that the infrared light transmittance of the display panel 10 in the light-transmitting area 12 can be further improved. Specifically, the material for forming the first transparent conductive layer 240 and the second transparent conductive layer 260 is indium tin oxide (ITO), and the material for forming the passivation layer 250 is silicon nitride. The infrared light transmittance of the composite film layer is 72%. Since the composite film layer is not provided in the light-transmitting area 12, the infrared light transmittance of the display panel 10 in the light-transmitting area 12 can be significantly improved.

In this embodiment, the second substrate 200 further comprises a third planarization layer 270 disposed on the composite film layer, and the third planarization layer 270 is located in the display area 11, the transition area 13 and the light-transmitting area 12, and a thickness of the third planarization layer 270 in the light-transmitting area 12 is greater than a thickness of the third planarization layer 270 in the display area 11. Specifically, the third planarization layer 270 located in the display area 11, the transition area 13 and the light-transmitting area 12 is formed by the same process, and the surface of the third planarization layer 270 away from the second base substrate 210 is a planar surface for achieving a planarizing function.

In this embodiment, the second substrate 200 further comprises the second alignment layer 280 disposed on the third planarization layer 270, and the second alignment layer 280 is located in the display area 11 and the transition area 13, and the second alignment layer 280 is provided with the second hole 281 in the boundary area of the light-transmitting area 12 and the transition area 13. That is, the edge of the second hole 281 formed in the second alignment layer 280 is the boundary line of the transition area 13 and the light-transmitting area 12. The second alignment layer 280 is provided with the second hole 281 in the light-transmitting area 12, and an edge of the second hole 281 is located at the boundary of the light-transmitting area 12 and the transition area 13. That is, the edge of the second hole 281 formed in the second alignment layer 280 is the boundary line of the transition area 13 and the light-transmitting area 12, and an area of the second hole 281 is equal to an area of the first hole 161. The infrared light transmittance of the second alignment layer 280 is 92%. Since the second alignment layer 280 is omitted in the light-transmitting area 12, the infrared light transmittance of the light-transmitting area 12 can be greatly improved.

In this embodiment, the second substrate 200 further comprises a second optical film material 290 filled in the second hole 281, and an infrared light transmittance of the second optical film material 290 is greater than an infrared light transmittance of the alignment layer 280. Since the second substrate 200 is formed with the second optical film material 290 with higher light transmittance in the area corresponding to the light-transmitting area 12, the infrared light transmittance of the display panel 10 in the light-transmitting area 12 can be effectively improved.

In this embodiment, a visible light reflectivity of the second optical film material 290 is less than a visible light reflectivity of the second alignment layer 280. By reducing the visible light reflectivity of the second optical film material 290, the uniform display effect of the display panel 10 can be improved, and the display quality of the display panel 10 can be improved.

In this embodiment, the second optical film material 290 is, for instance, an antireflective film, and the antireflective film is filled in the second hole 281 of the second alignment layer 280. The antireflective film can reduce the reflectivity of visible light in the display panel 10 and increase the transmittance of infrared light in the display panel 10.

Embodiment Two

Figure 7:
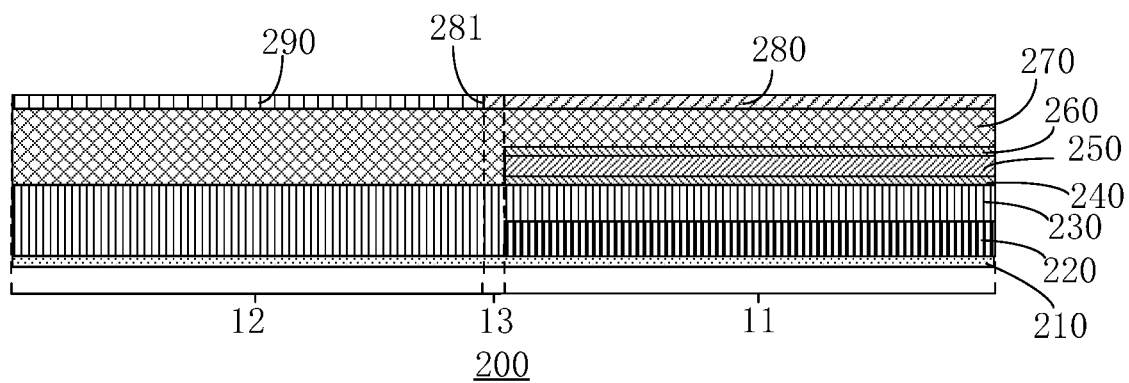
FIG. 7 shows a structural diagram of a second substrate in the display panel provided in the second embodiment of the present application.

FIG. 7 shows a structural diagram of a second substrate in the display panel provided in the second embodiment of the present application. As shown in FIG. 7, the second embodiment of the present application provides a display panel 10. The structure of the display panel 10 is similar to that of the display panel 10 in the first embodiment of the present application, and the same parts will not be repeated in this embodiment.

The difference is that in the display panel 10 provided by the second embodiment of the present application, the interlayer dielectric layer 220 is located in the display area 11 and the transition area 13, that is, the interlayer dielectric layer 220 is not located in the light-transmitting area 12. Therefore, the film structure of the light-transmitting area 12 is simplified, and the number of film layers is reduced, and the infrared light transmittance of the display panel 10 in the light-transmitting area 12 can be further improved.

Moreover, the second substrate 200 further comprises a second planarization layer 230 disposed on the interlayer dielectric layer 220, and the second planarization layer 230 is located in the display area 11, the transition area 13 and the light-transmitting area 12, and a thickness of the second planarization layer 230 in the light-transmitting area 12 is greater than a thickness of the second planarization layer 230 in the display area 11. Specifically, the second planarization layer 230 located in the display area 11, the transition area 13 and the light-transmitting area 12 is formed by the same process, and the surface of the second planarization layer 230 away from the second base substrate 210 is a planar surface for achieving a planarizing function.

Embodiment Three

Figure 8:
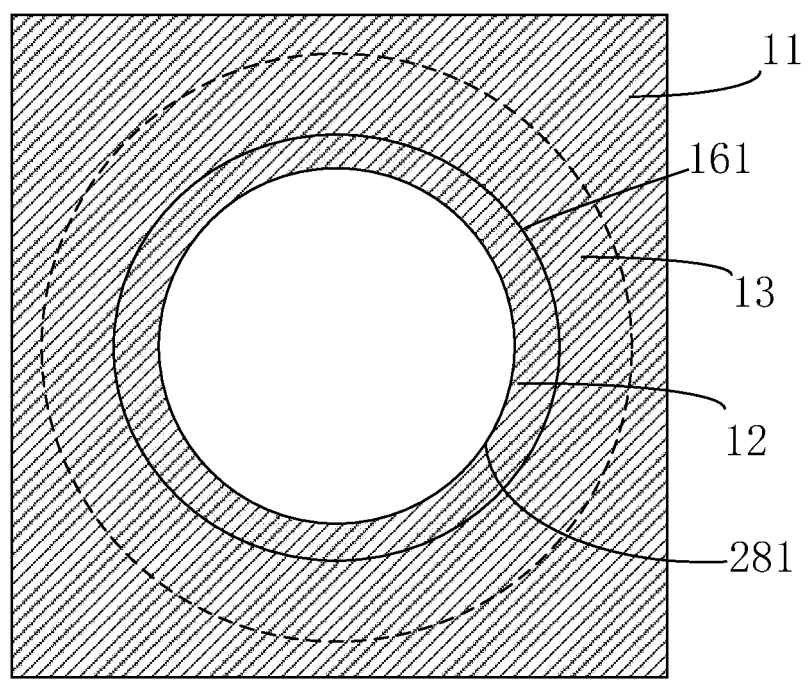
FIG. 8 shows a diagram of a position of a first hole and a second hole provided in the third embodiment of the present application in the area A in FIG. 2.
Figure 9:
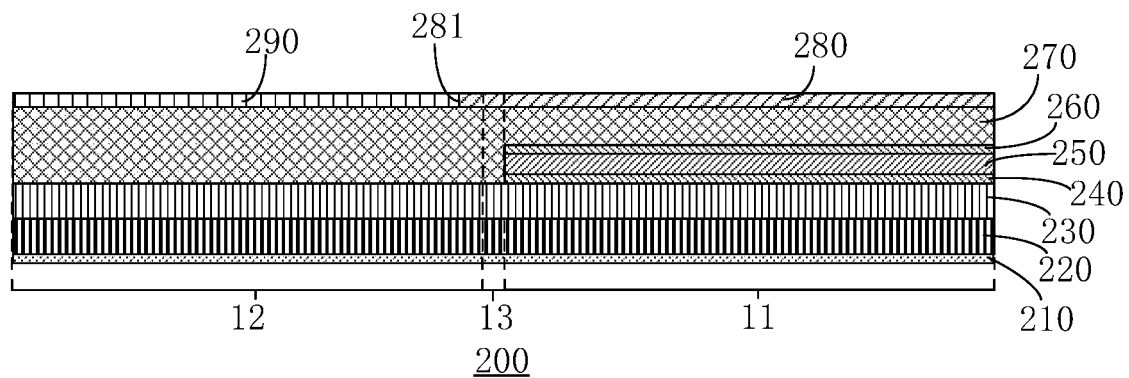
FIG. 9 shows a structural diagram of a second substrate in the display panel provided in the third embodiment of the present application.

FIG. 8 shows a diagram of a position of a first hole and a second hole provided in the third embodiment of the present application in the area A in FIG. 2; FIG. 9 shows a structural diagram of a second substrate in the display panel provided in the third embodiment of the present application. As shown in FIG. 3, FIG. 8 and FIG. 9, the third embodiment of the present application provides a display panel 10. The display panel 10 is similar in structure to the display panel 10 in the first embodiment of the present application. For instance, the structure of the first substrate 100 in the third embodiment is the same as that of the first substrate 100 in the first embodiment, and the same parts will not be repeated in this embodiment.

The difference is that in the display panel 10 provided by the third embodiment of the present application, an area of the first hole 161 and an area of the second hole 281 are different. Specifically, the first alignment layer 160 on the first substrate 100 is located in the display area 11 and the transition area 13, and the first alignment layer 160 is provided with the first hole 161 in the light-transmitting area 12, and an edge of the first hole 161 is located at the boundary of the light-transmitting area 12 and the transition area 13. That is, the edge of the first hole 161 formed in the first alignment layer 160 is the boundary line of the transition area 13 and the light-transmitting area 12; the second alignment layer 280 on the second substrate 200 is located in the display area 11, the transition area 13 and the light-transmitting area 12. The second alignment layer 280 is provided with the second hole 281 in the light-transmitting area 12, and an edge of the second hole 281 is located in the light-transmitting area 12. That is, an area of the second hole 281 is smaller than an area of the first hole 161, so that interference and diffraction of light can be reduced, and the imaging result of the optical element disposed on the side of the display panel 10 can be improved.

Embodiment Four

Figure 10:
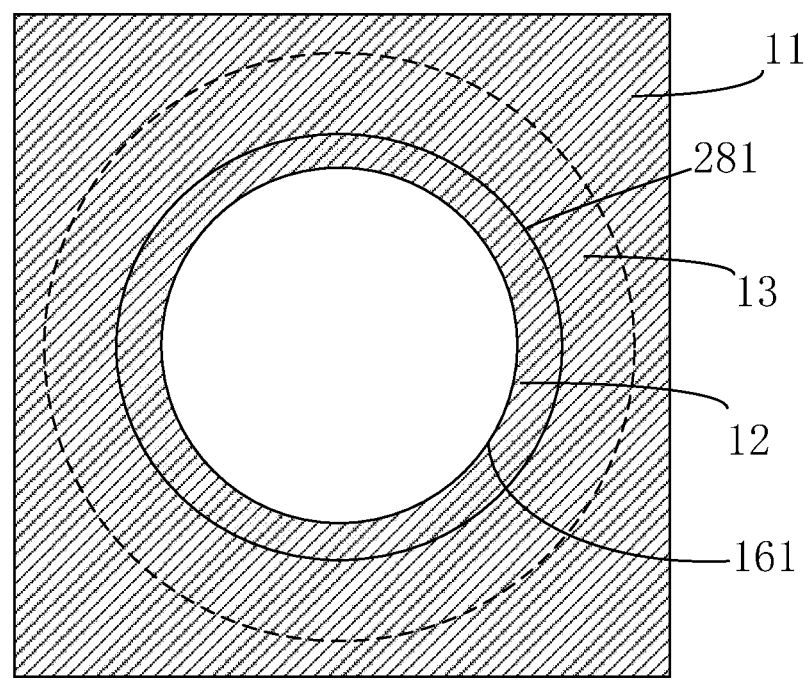
FIG. 10 shows a diagram of a position of a first hole and a second hole provided in the fourth embodiment of the present application in the area A in FIG. 2.
Figure 11:
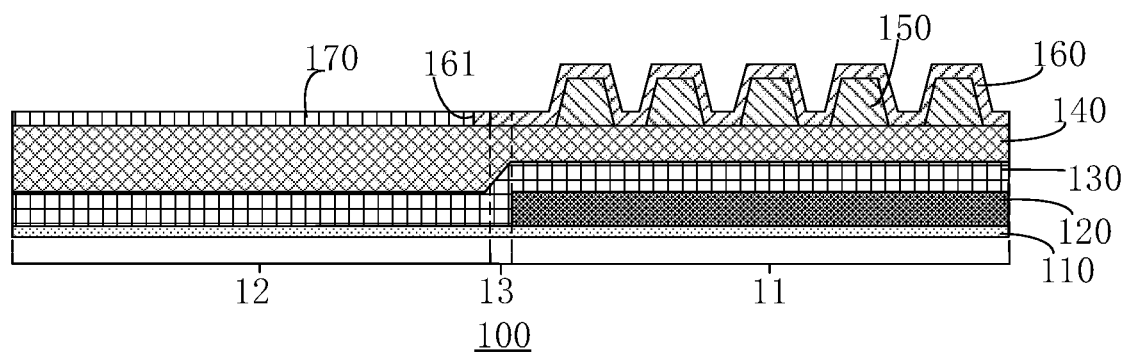
FIG. 11 shows a structural diagram of a first substrate in the display panel provided in the fourth embodiment of the present application.

FIG. 10 shows a diagram of a position of a first hole and a second hole provided in the fourth embodiment of the present application in the area A in FIG. 2; FIG. 11 shows a structural diagram of a first substrate in the display panel provided in the fourth embodiment of the present application. As shown in FIG. 6, FIG. 10 and FIG. 11, the fourth embodiment of the present application provides a display panel 10. The structure of the display panel 10 is similar to that of the display panel 10 in the fourth embodiment of the present application, such as the second substrate 200, and the same parts will not be repeated in this embodiment.

The difference is that in the display panel 10 provided by the fourth embodiment of the present application, an area of the first hole 161 and an area of the second hole 281 are different. Specifically, the second alignment layer 280 on the second substrate 200 is located in the display area 11 and the transition area 13. The second alignment layer 280 is formed with the second hole 281 in the light-transmitting area 12, and an edge of the second hole 281 is located at the boundary of the light-transmitting area 12 and the transition area 13. That is, the edge of the second hole 281 formed in the second alignment layer 280 is the boundary line of the transition area 13 and the light-transmitting area 12; the first alignment layer 160 on the first substrate 100 is located in the display area 11, the transition area 13 and the light-transmitting area 12. The first alignment layer 160 is provided with the first hole 161 in the light-transmitting area 12, and an edge of the first hole 161 is located in the light-transmitting area 12. That is, an area of the first hole 161 is smaller than an area of the second hole 281, so that interference and diffraction of light can be reduced, and the imaging result of the optical element disposed on the side of the display panel 10 can be improved.

Embodiment Five

Figure 12:
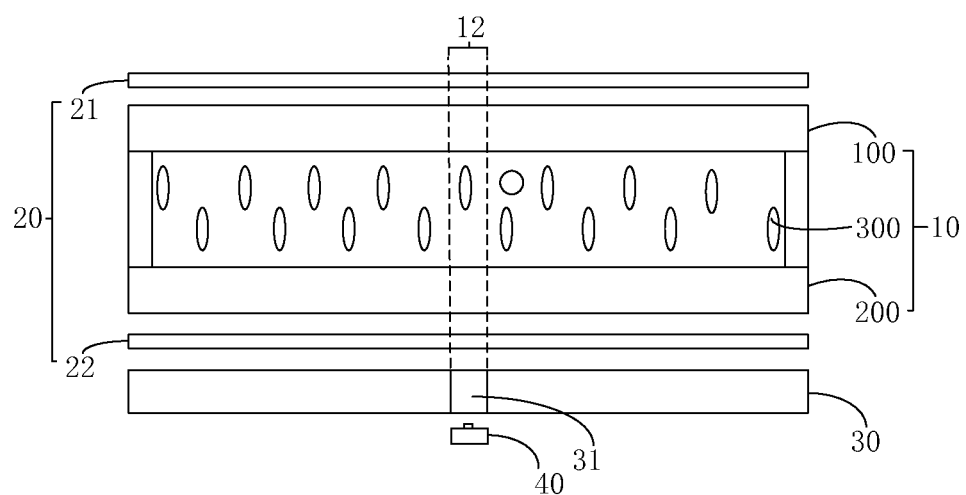
FIG. 12 shows an assembly exploded view diagram of the display device provided in the fifth embodiment of the present application.

FIG. 12 shows an assembly exploded view diagram of the display device provided in the fifth embodiment of the present application. As shown in FIG. 12, the fifth embodiment of the present application provides a display device. The display device comprises the display panel 10 in the first to fourth embodiments as aforementioned, a polarizer 20, an optical element 40 and a backlight module 30. The display panel 10 comprises: a first substrate 100, a second substrate 200 and a liquid crystal layer 300 disposed between the first substrate 100 and the second substrate 200, and the display panel 10 comprises a light-transmitting area 12 capable of transmitting light; the backlight module 30 is arranged on one side of the display panel 10 and is employed to provide the display panel 10 with a light source required for display, and the backlight module 30 is provided with a light-transmitting hole 31 at a position corresponding to the light-transmitting area 12; The polarizer 20 comprises a first polarizer 21 and a second polarizer 22 that the polarization axes thereof are perpendicular to each other. The first polarizer 21 is disposed on the side of the first substrate 100 away from the liquid crystal layer 300. The second polarizer 22 is disposed on the side of the second substrate 200 away from the liquid crystal layer 300.

In this embodiment, the optical element 40 is arranged on the side of the backlight module 30 away from the display panel 10, and is respectively arranged corresponding to the light-transmitting area 12 of the display panel 10 and arranged corresponding to the light-transmitting hole 31 of the backlight module 30. The optical element 40 is employed to receive the light that sequentially penetrates the light-transmitting area 12 of the display panel 10 and the light-transmitting hole 31 of the backlight module 30 to realize light sensing and imaging. The optical element 40 is, for instance, employed to perform DMS monitoring function. The light is infrared light, and the infrared light possesses the function of directly penetrating the first polarizer 21, the liquid crystal layer 300 and the second polarizer 22, and the optical element 40 is correspondingly an infrared camera. The infrared camera can well protect user privacy. However, it should be noted that the embodiment of the present application does not limit the type of light and the photosensitive type of the optical element 40. The light may also be other than infrared light. Accordingly, the optical element 40 may also possess the function of sensing the other light.

In conclusion, the present application provides a display panel and a display device. The display panel comprises: a first substrate and a second substrate, which are oppositely arranged, and a liquid crystal layer arranged between the first substrate and second substrate, and the first substrate and the second substrate are both provided with an alignment layer on a side close to the liquid crystal layer, wherein the display panel comprises a display area and a light-transmitting area, and at least one of the alignment layers is provided with a hole in the light-transmitting area. In the present application, a hole is provided in at least one alignment layer of the display panel. Therefore, when external light enters the optical element through the display panel, the filtering effect of the alignment layer on the light is greatly reduced, and light loss is reduced, to improve the light transmittance of the area of the display panel corresponding to the optical element. It is to reduce the difficulty for optical elements to collect external ambient light, and increase the amount of light collected by the optical element for improving the imaging result.

The display panel and the display device provided by the embodiments of the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. A display panel, wherein the display panel comprises:
    a first substrate and a second substrate arranged opposite to each other;
    a liquid crystal layer arranged between the first substrate and second substrate;
    a first alignment layer provided on a side of the first substrate close to the liquid crystal layer; and
    a second alignment layer provided on a side of the second substrate close to the liquid crystal layer,
    wherein the display panel comprises a display area, a light-transmitting area, and a transition area located between the display area and the light-transmitting area,
    the first alignment layer is provided with a first hole in the light-transmitting area, the second alignment layer is provided with a second hole in the light-transmitting area, and an area of the first hole and an area of the second hole are the same or different, and
    a display panel film structure in the transition area is different from a display panel film structure in the display area and a display panel film structure in the light-transmitting area.

2. The display panel according to claim 1, wherein each of the first hole and the second hole is filled with an optical film material, and an infrared light transmittance of the optical film material is greater than an infrared light transmittance of each of the first alignment layer and the second alignment layer.

3. The display panel according to claim 2, wherein a visible light reflectivity of the optical film material is less than a visible light reflectivity of each of the first alignment layer and the second alignment layer.

4. The display panel according to claim 1, wherein the first substrate comprises a first base substrate and a black matrix layer provided on the first base substrate, the black matrix layer is located in the display area, and the black matrix layer comprises a black matrix ring located at a boundary of the display area and the transition area.

5. The display panel according to claim 4, wherein the first substrate further comprises a color filter layer and a first planarization layer sequentially stacked on the black matrix layer,
    the color filter layer is located in the display area, the transition area and the light-transmitting area,
    the first planarization layer is located in the display area, the transition area and the light-transmitting area, and
    a thickness of part of the first planarization layer in the light-transmitting area is greater than a thickness of part of the first planarization layer in the display area.

6. The display panel according to claim 5, wherein the first alignment layer is disposed on the first planarization layer, the first alignment layer is located in the display area and the transition area, and an edge of the first hole is located at a boundary of the light-transmitting area and the transition area.

7. The display panel according to claim 6, wherein the first substrate further comprises a first optical film material filled in the first hole, and an infrared light transmittance of the first optical film material is greater than an infrared light transmittance of the first alignment layer.

8. The display panel according to claim 6, wherein the first substrate further comprises a support column layer disposed between the first alignment layer and the first planarization layer, and the support column layer comprises a plurality of support columns arranged at intervals in the display area.

9. The display panel according to claim 1, wherein the second substrate comprises a second base substrate and a thin film transistor layer disposed on the second base substrate,
    the thin film transistor layer comprises a thin film transistor and a metal trace,
    the thin film transistor is located in the display area and the transition area, and
    the metal trace is located in the display area and the transition area, and part of the metal trace located in the transition area is a ring trace.

10. The display panel according to claim 9, wherein the thin film transistor layer further comprises an interlayer dielectric layer disposed on the second base substrate, and the interlayer dielectric layer is located in the display area and the transition area.

11. The display panel according to claim 10, wherein the second substrate further comprises a second planarization layer disposed on the interlayer dielectric layer, and the second planarization layer is located in the display area, the transition area and the light-transmitting area, and a thickness of part of the second planarization layer in the light-transmitting area is greater than a thickness of part of the second planarization layer in the display area.

12. The display panel according to claim 11, wherein the second substrate further comprises a composite film layer disposed on the second planarization layer, the composite film layer comprises a first transparent conductive layer, a passivation layer and a second transparent conductive layer sequentially stacked on the second planarization layer, and the composite film layer is located in the display area.

13. The display panel according to claim 12, wherein the second substrate further comprises a third planarization layer disposed on the composite film layer, the third planarization layer is located in the display area, the transition area and the light-transmitting area, and a thickness of part of the third planarization layer in the light-transmitting area is greater than a thickness of part of the third planarization layer in the display area.

14. The display panel according to claim 13, wherein the second alignment layer is disposed on the third planarization layer, the second alignment layer is located in the display area, the transition area, and the light-transmitting area, and an edge of the second hole is located in the light-transmitting area.

15. The display panel according to claim 14, wherein the second substrate further comprises a second optical film material filled in the second hole, and an infrared light transmittance of the second optical film material is greater than an infrared light transmittance of the second alignment layer.

16. A display device, comprising: an optical element, a backlight module and a display panel,
wherein the display panel comprises:
a first substrate and a second substrate arranged opposite to each other;
a liquid crystal layer arranged between the first substrate and second substrate;
a first alignment layer provided on a side of the first substrate close to the liquid crystal layer; and
a second alignment layer provided on a side of the second substrate close to the liquid crystal layer,
wherein the display panel comprises a display area, a light-transmitting area, and a transition area located between the display area and the light-transmitting area,
the first alignment layer is provided with a first hole in the light-transmitting area, the second alignment layer is provided with a second hole in the light-transmitting area, and an area of the first hole and an area of the second hole are the same or different, and
a display panel film structure in the transition area is different from a display panel film structure in the display area and a display panel film structure in the light-transmitting area, and
wherein the backlight module is arranged on a side of the display panel and provided with a light-transmitting hole at a position corresponding to the light-transmitting area, and the optical element is arranged on a side of the backlight module away from the display panel to be opposite to the light-transmitting hole.

17. The display device according to claim 16, wherein the optical element is an infrared camera.

* * * * *